United States Patent [19]
Chika

[11] 3,885,810
[45] May 27, 1975

[54] SEAT SUPPORTING STRUCTURE FOR FAST MOVING VEHICLES

[76] Inventor: John J. Chika, 1350 Orchard Ridge Rd., Bloomfield Hills, Mich. 48013

[22] Filed: Jan. 10, 1972

[21] Appl. No.: 216,344

[52] U.S. Cl.............. 280/150 B; 296/65 A; 297/216
[51] Int. Cl............................................... B60r 21/10
[58] Field of Search......... 296/63, 65 A; 280/150 B, 280/150 C, 150 SB; 297/216; 244/122 R, 244/122 B; 188/1 C

[56] References Cited
UNITED STATES PATENTS

| | | | |
|---|---|---|---|
| 2,740,642 | 4/1956 | Atwood | 280/150 SB X |
| 2,833,554 | 5/1958 | Ricordi | 280/150 B |
| 2,891,804 | 6/1959 | Frayne et al. | 280/150 SB |
| 3,129,017 | 4/1964 | Graham | 280/150 B |
| 3,669,397 | 6/1972 | Le Mire | 297/216 X |
| 3,762,505 | 10/1973 | Morse | 188/1 C |

Primary Examiner—Robert J. Spar
Assistant Examiner—Leslie J. Paperner

[57] ABSTRACT

An auxiliary supporting structure for fast moving vehicles equipped with seats for its occupants, to be installed directly behind the said seats, and providing stronger means of attachment for various individual body restraining devices that may be used by the vehicle occupants but requiring attaching at three points: two at the usual seat-belt location and the top one behind and inboard from the user's head; while also providing added support and rigidity to the whole seat structure together with other benefits explained in this application.

46 Claims, 27 Drawing Figures

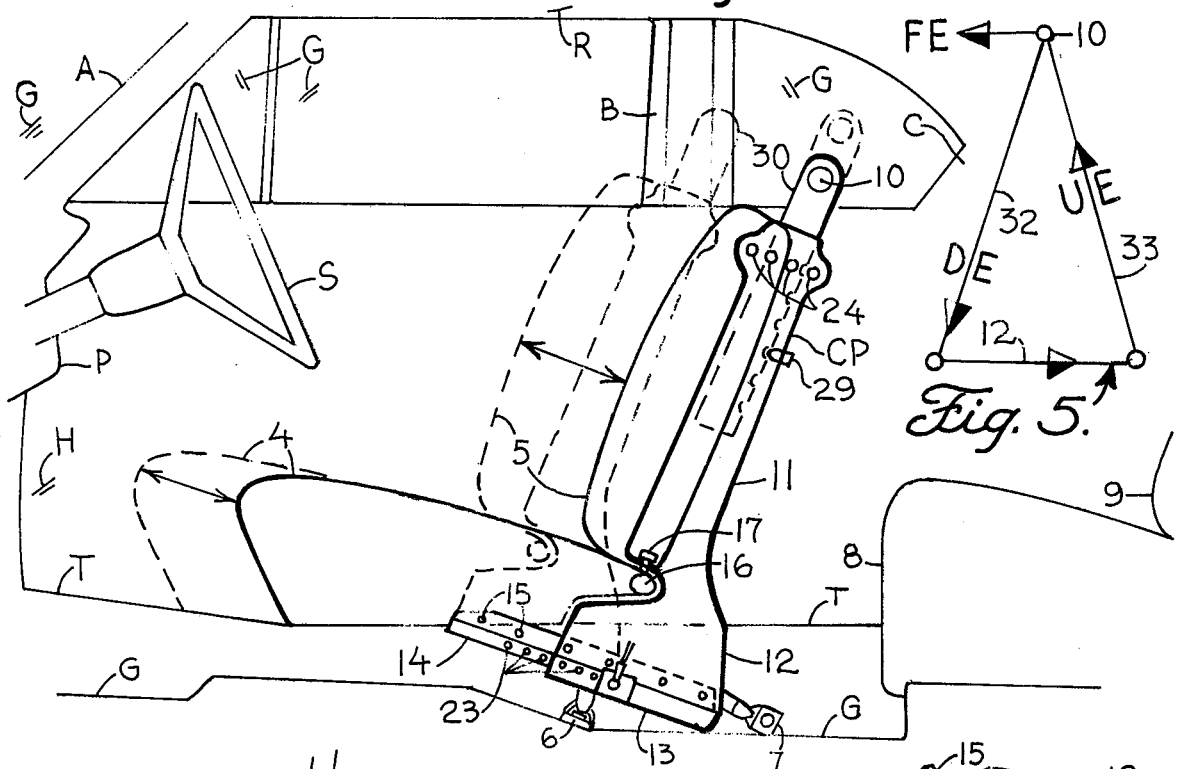
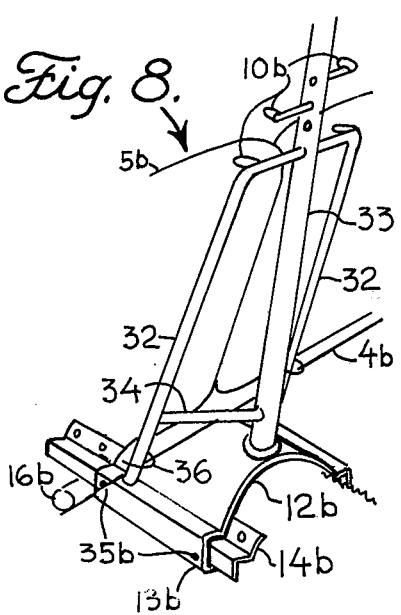
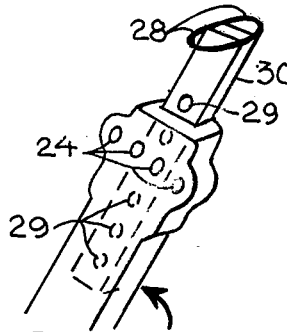
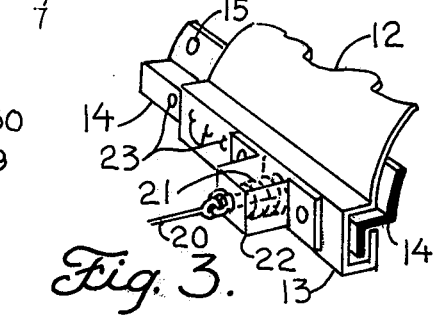
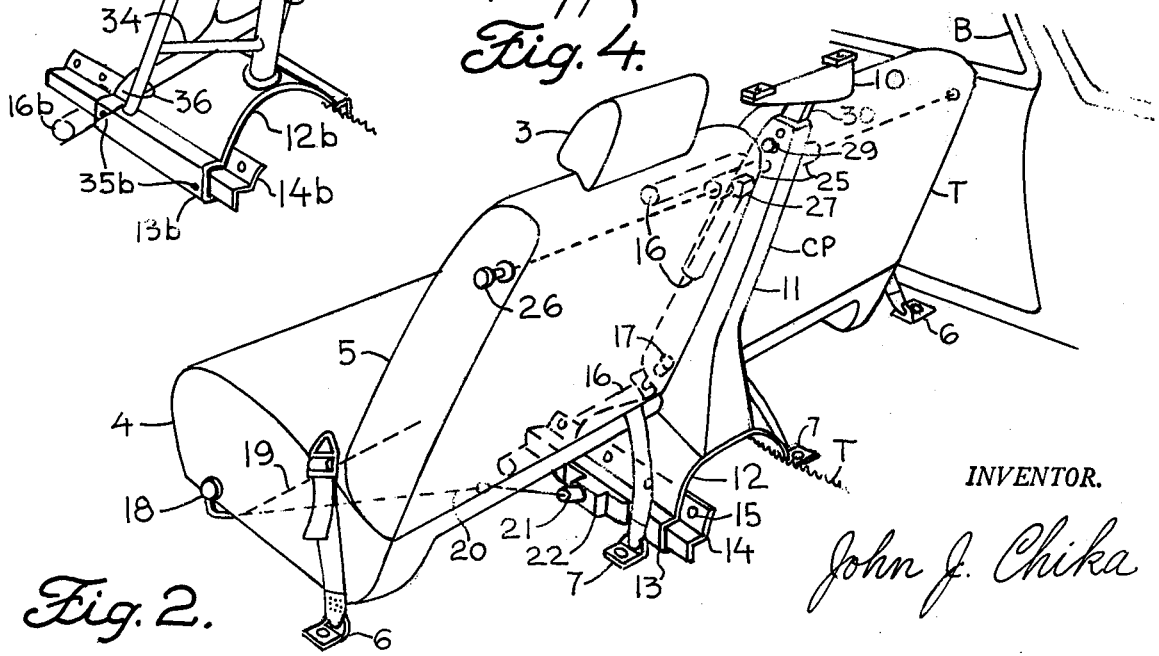

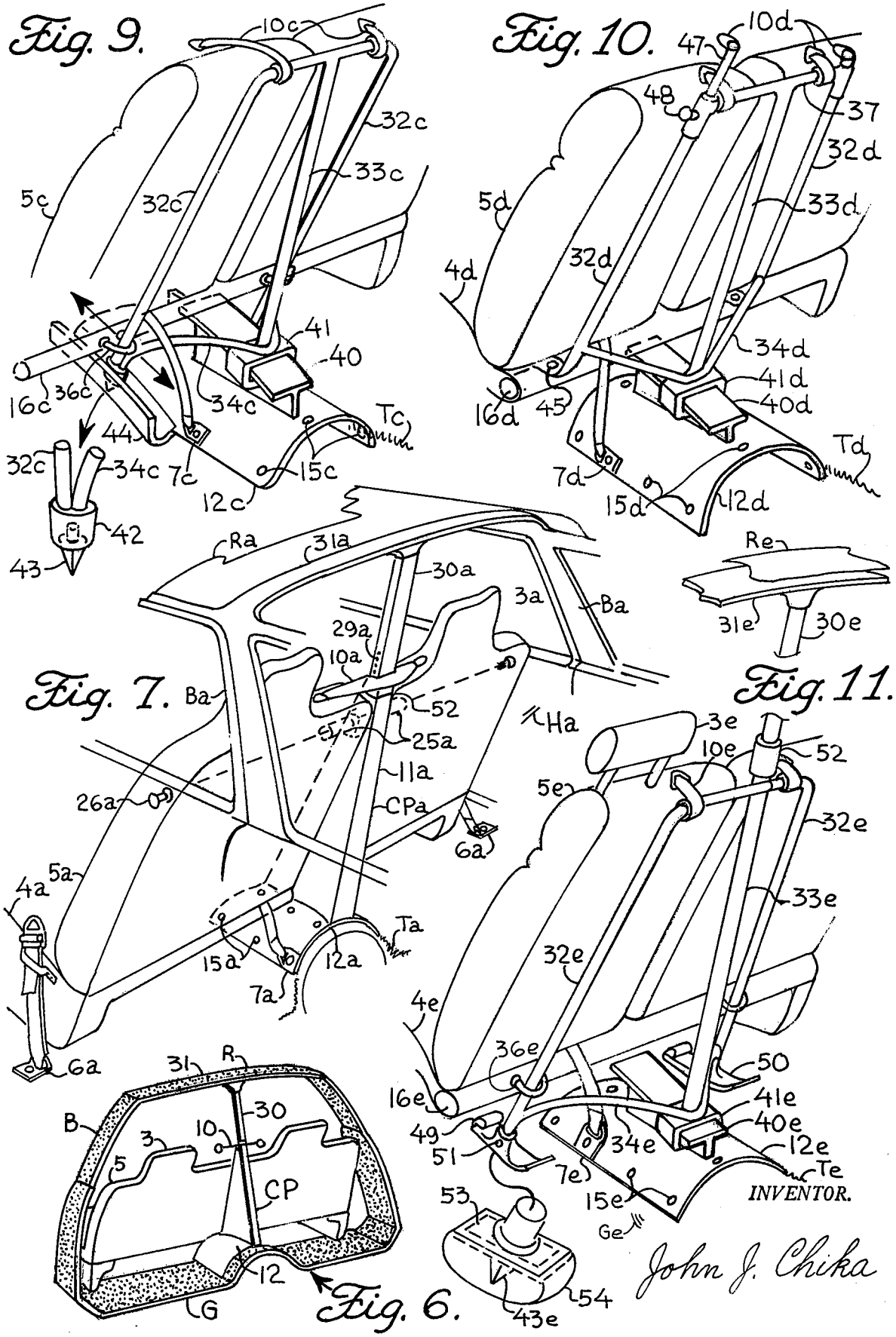

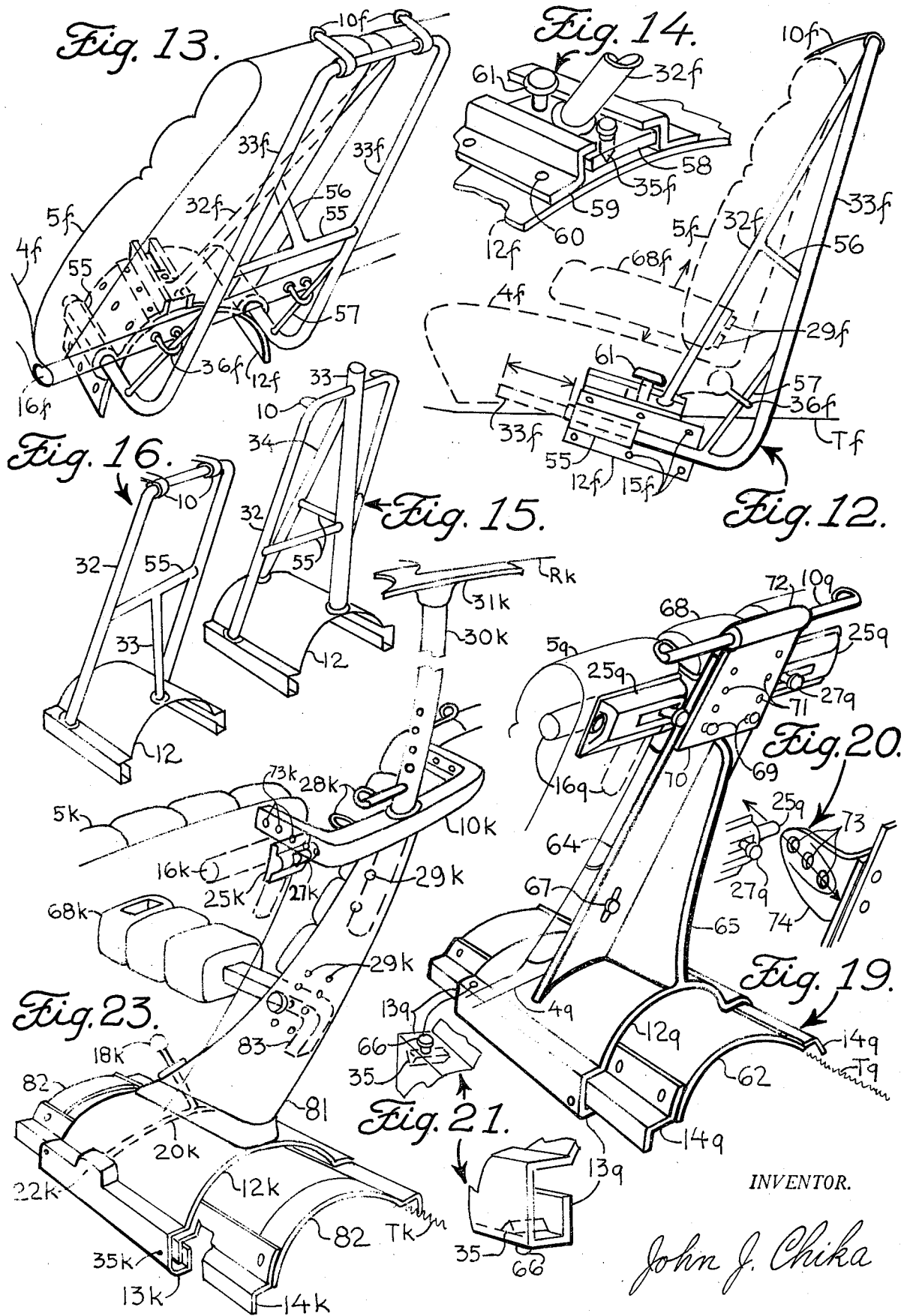

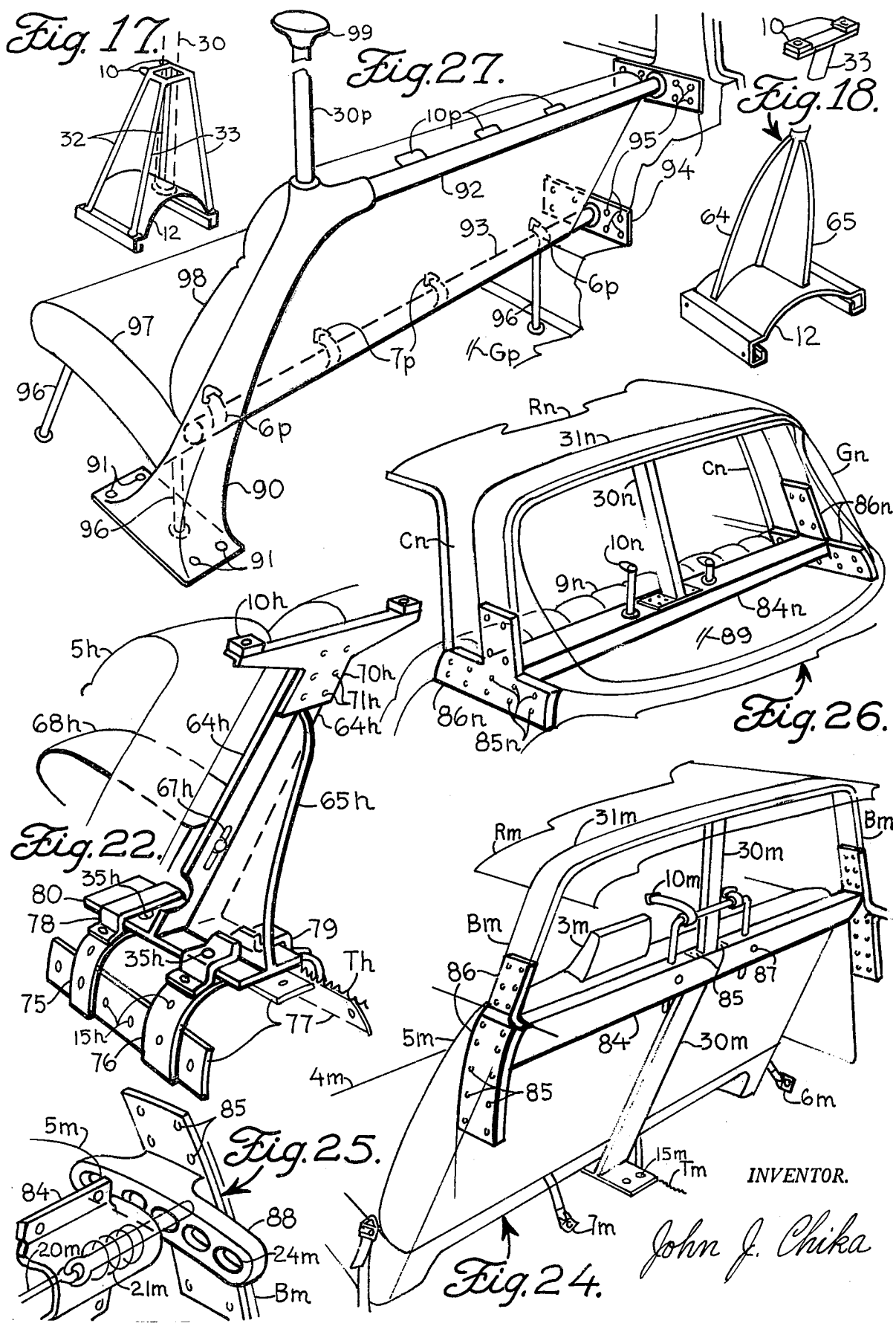

SEAT SUPPORTING STRUCTURE FOR FAST MOVING VEHICLES

BACKGROUND OF THE INVENTION

In my copending Pat. application Ser. No. 168,314 for INDIVIDUAL RESTRAINING DEVICE FOR A VEHICLE USER filed Aug. 2, 1971, I am disclosing a human packaging system supported by three anchor means: two at the usual locations used by the existing seat-belts, and the third located back of and inboard of the user's head. Because the existing seat structures would not withstand the stresses of crash decelerations and the resulting inertia loads thrust upon it by the occupant's bodies anchored to it, the present invention discloses varied means of providing top anchor means independent of the seat structure itself, while making the present seat more rigid and preventing it from possible collapsing or tearing off.

SUMMARY OF THE INVENTION

This invention relates to auxiliary reinforcing structures for fast moving vehicles in general and to seat supporting structures combined with anchor means for body restraining devices in particular. In the front seat adaptation it would act as a rigid central post, immune from even the most severe impacts of collision, stabilizing the whole front seat structure by splitting the span of unsupported seat frame by half. There are many other benefits offered by the present invention, such as:

1. Preventing the unwanted tilting of the front seat back cushion under collision impact.
2. Preventing the whole front seat structure from tilting forward or backward, collapsing, or tearing off the floor.
3. Providing an ideal "roll-over" bar protection system for front as well as back seat passengers.
4. In four-door sedans providing a real rigid mid-section ring of steel protection by transversely connecting the two B pillars at the belt-line height of the vehicle.
5. Preventing the back seat cushion from tearing off.
6. Creating a rigid bulkhead in the area behind the rear seat cushion, thus strengthening the rear quarter-panel area.
7. Eliminating the need for long shoulder straps suspended from the roof-rails of vehicles, especially public conveyances.
8. Dissipating the kinetic energy stored in human torsoes during a collision into large and least vulnerable areas of cars.
9. Packaging and holding the occupant for any length of primary and secondary impacts.
10. Providing "yielding" qualities to increase deceleration time for absorbtion of the inertia load of a collision.
11. Adapting new as well as the existing vehicles for easy, economical conversion for the use of any "three-point" suspension individual restraining devices by safety minded travelers.

Other advantages of my invention will become apparent upon consideration of the present disclosure in more detail with reference to the accompanying drawings:

BRIEF DESCRIPTION OF THE DRAWINGS

FIG. 1 is a diagrammatic side elevational view showing my invention as adapted to the front seat of a motor vehicle;

FIG. 2 is a perspective view of the back interior portion of a motor vehicle equipped with my invention;

FIG. 3 is a fragmentary detail perspective view of the longitudinal locking and adjustment means for the assembly;

FIG. 4 is a fragmentary detail perspective view of optional holding and adjustment means to keep the seat-back cushion at any desired angle and to prevent it from unwanted tilting;

FIG. 5 is a diagrammatic sketch illustrating the operating principle of my invention;

FIG. 6 is a schematic perspective view of a cross-section of a typical four-door sedan;

FIG. 7 is a perspective view of the rear compartment of a typical two-door sedan with stationary front seat, showing typical installation of my invention, including the "roll-over" bar;

FIG. 8 is a fragmentary perspective view showing my invention adapted to the tubular type of construction;

FIG. 9 is a fragmentary perspective view of another modification of this invention wherein the G-forces of an impact are absorbed by one large panel;

FIG. 10 is a fragmentary perspective view of another embodiment of this invention wherein the downward pressure of the impact is absorbed by the rear structure of the seat frame and the rest by the plate attached over the tunnel section;

FIG. 11 is a fragmentary perspective view of still another adaptation of my invention wherein part of the G-load is absorbed by the floor and part by the plate secured to the tunnel;

FIG. 12 is a diagrammatic side elevational view of another modification of the present invention, using tubular means of construction, with one member passing through the seat cushion as used with a "split-seat" front seat of a vehicle, wherein the total G-forces of an impact are absorbed by the tunnel section;

FIG. 13 is a perspective view of the modification shown in FIG. 12, clarifying it further;

FIG. 14 is a fragmentary detail perspective view of the middle anchor means of adjustable positioning and locking used in the modifications as revealed in FIG. 12 and 13;

FIGS. 15, 16, 17 and 18 are perspective sketches of some construction variations of the "Centralpost" assembly possible within the scope of my invention;

FIG. 19 is a perspective view of another modification of my invention as adapted to existing seats with center arm-rests;

FIG. 20 is a detail perspective view of means to adjust and lock the seat-back cushion, and FIG. 21 explains in more detail the automatic "lock" that functions only during a collision;

FIG. 22 is a perspective view of still another adaptation of my invention as applied to the "center arm rest" seat;

FIG. 23 is a perspective view of another embodiment of my invention as adapted to the "bucket seat" conditions;

FIG. 24 is a perspective view of a rear compartment of a typical four-door sedan, showing one adaptation of my patent to the front seat;

FIG. 25 is a detail perspective of a seat adjustment means;

FIG. 26 is a perspective view of the rear seat modification of the present invention;

FIG. 27 is a perspective view of a typical seat in a public conveyance system as modified by adaptation of my invention.

DESCRIPTION OF THE PREFERRED EMBODIMENTS

FIGS. 1, 2, 3, 4 and 5 should be considerred together to better comprehend the total concept of this invention.

FIG. 1 shows a diagrammatic side elevational view of an automobile front seat illustrating working principles of my invention. The hard interior surfaces of the auto body, such as roof R, pillars A, B, and C, glass panels G, steering wheel S, instrument panel P, and door panels H represent the areas of greatest hazard to the occupants of any fast moving vehicle involved in a collision.

The floor G of the vehicle has in its longitudinal mid-section tunnel T; the front seat cushion 4 and the seat-back cushion 5 comprise the seat assembly; the outboard seat-belt anchors 6 are usually mounted to the floor G, while the inboard anchors 7 are normally at the side of the tunnel T.

The head anchor 10 to be used as the third or top means of anchorage in conjunction with such individual body restraining devices as my "Autovest," "Autogard" or any other three-point hook-up systems could be secured to the top of the seat-back cushion 5, if it would be strong enough to withstand the stress of collision impact without collapsing or tearing off the floor; with the way things look today, the "Centralpost" assembly CP, as described and disclosed in the present invention will provide one possible solution to the dilemma of our highway safety.

The "Centralpost" assembly CP basically consists of the more or less vertical post providing the adjustable anchoring means 10 for the top hook-up of the body restraining devices and the base which is adjustably secured to the floor of the vehicle and with which the post coacts to produce means of various adjustments, controls, emergency "fail-safe" features and other benefits as will be evident from this description and disclosures.

FIG. 2 is a perspective view of the back interior portion of a typical closed motor vehicle body showing the back side of the front seat with one adaptation of the present invention, constructed and installed in accordance with the principles of this patent.

Looking now at FIG. 1 and FIG. 2, the upright column of the Centralpost CP, in this case made of sturdy stampings 11 is secured at its bottom to the plate 12, which is shaped to straddle and slide over the tunnel T, and ends on each lower side in a modified channel section 13, which slides freely over the modified Z-bar 14, which is secured in parallel alignment to the side of tunnel T by fastening means such as 15. The sturdiest part of the seat is its frame 16, and the Centralpost CP is attached to it by means such as 17, so that both may be moved back and forth as one unit. The seat is generally controlled and locked in any desired position by means as 18, with actuating means as 19; to this is attached additional actuating means as 20, which operate the spring-loaded bolt as 21 in housing as 22 which in turn engages with plurality of holes as 23, in the Z-bar 14, to allow for the seat and Centralpost to coact in unison, and to be adjusted and locked in any position desired by the driver. In cases where the front seat is constructed so that there is no danger of it sliding forward or tearing off the floor in a collision, this accessory may be omitted. Also, in vehicles where there is no provision to keep the back cushion from unwanted tilting, the upper part of Centralpost may be adapted, as shown in FIG. 4, with a plurality of holes as 24 to accept a spring loaded bolt as 25, so that the cushion may be locked in any desired position of tilt and kept from any unwanted tilting. The remote controls 26, actuating the direct sliding-bolt control as 27 could also be added for convenience.

The top anchor means as 10 could be of various configurations without departing from the spirit of my invention; they could consist of the quick-release variety now common in cars, as in FIG. 2, or consist of just plain steel rods welded to the post as 28 in FIG. 4, and innumerable configurations in-between. Also the Centralpost itself may be extendable into various heights to accomodate the user's torso height by various means as 29, but again, various principles of adjustment could be used, employing friction, ratchet, spring-loaded bolt or any other means as dictated by circumstances. Also, as shown in FIGS. 7, 8, 11, 15 and 23, the extension as 30 may continue all the way to the roof panel R, where it would be secured to the roof reinforcing means as 31, and act as the main component of a "roll-over bar" system, which could even be removable by such means as 52 in FIG. 11.

FIG. 5 shows a simple diagram illustrating the working theory of the Centralpost. Its secret is the way it disperses the kinetic energy stored in the human torso under severe deceleration: all the force of inertia which pulls on the top anchor as 10 is transformed from forward energy F–E to downward energy D–E into the front of the bottom plate 12, and through it into upward pull U–E from the back of the plate 12 and back to the top anchor means 10. Thus, whatever the inertia load against the top anchor 10 may be, it is dissipated into the bottom plate 12 and through the Z-bars 14 into the tunnel T and floor G.

FIG. 6 is a schematic perspective view of a typical cross-section taken through the general area of the B pillars in a vehicle of the four-door type, looking toward the front seat, and illustrates the paramount feature of this invention:

Because the Centralpost is located at both the transverse as well as longitudinal center of the vehicle interior, it is immune from any deformation or destruction due to any type of frontal, lateral or rear impact and therefore its function remains unimpeded even in the most severe collisions. Also, because it is mounted to the floor, over the tunnel section, it may be made sufficient very cheaply and with the least amount of added weight. When extended to the roof in form of a "roll-over" bar joined with reinforcing roof channels and the B pillars strengthened, a vertiable "ring of steel" would be created.

FIG. 7 is a perspective view of the rear compartment of a typical two-door sedan, but with stationary front seat, equipped with somewhat simplified adaptation of my invention, including the "roll-over bar" feature.

Since the seat is stationary, the Z-bar 14 is omitted and the plate 12a is bolted directly to the tunnel. The inboard seat-belt anchors 7a may be secured to the plate 12a and the tilting controls 25a and 26a are used only if needed. The extension 30a is secured to the roof channel reinforcement 31 which is attached to the roof Ra, and the top anchor means as 10a is adjustable by means as 29a.

FIG. 8 is a fragmentary perspective view of another modification of this invention, using welded, tubular type of construction wherever possible, and simplified for use in newer vehicles in which the seat has an antitilting means. If it should be used also as a "roll-over bar," the central assembly would include larger diameter steel tubing as 33, extended for attachment to the roof, and two thinner tubes as 32 welded to 33 on their top ends and the channels 13b on their lower ends. The assembly is pulled and pushed in conjunction with the seat by simple holding means such as U-bolts 36 secured to the seat frame 16b. The hard steel grippers as 35b would "freeze" the Centralpost in any position under impact collision, as explained in more detail in FIG. 21. The top anchors 10b may either be welded to the tubes 32 or threaded into larger tube 33 in various heights; the braces 34 are of smaller diameter tubes or solid steel rods.

FIGS. 9, 10, 11, 12, 13 and 14 illustrate further modifications of my broad concept of the present invention, wherein the basic configuration of the vertical assembly CP consists of a plurality of tubular members, and several of many possible ways to coordinate the post assembly CP with various types of base plates as 12.

Specifically, modification shown in FIG. 9 is adapted for seats not strong enough to absorb any additional loading, and the total inertia load is dissipated into the tunnel Tc by means of the bottom plate 12c, which is secured to the tunnel section and is enlarged and modified to slidably accomodate lower ends of tubes 32c, which transfer the downward force of kinetic energy D–E into it. The tubes 32c are welded to bracing tubes as 34c and together inserted and welded into cap-like means 42 which terminate in hard steel points 43. The modified channel sections 44 allow the points 43 to glide back and forth in their bottom channels, but in a collision, the points 43 will partially pierce through them and thus "lock" the whole Centralpost and the seat at that point and prevent it from sliding forward. The channel 44 is contoured to the same sweep as the seat assembly describes when moved back and forth. On the longitudinal center line of the plate 12c is welded modified T-shaped rail 40, with its flat top surface in parallel relationship with the bottom line of the channel 44, and over it a slidably operative shoe as 41, which is welded to the bottom of tube 33c and which absorbs the upward pull of forces U–E. The reinforcing tube 34c is also welded to it and thus a very rigid unit is produced which will take the most severe punishment. The tubular means as 32c may be made from one piece, bent to form the top horizontal section as shown in FIG. 9, or may be cut on the top as shown in FIG. 10, and the two may be connected by cross piece 37, in which case the top anchor means 10d may be simply inserted into the open ends of reinforced tubes 32d and locked in desired height by means as 48. In FIG. 9 the top anchor as 10c consists of a length of lap-belt webbing bolted to the tube 32c, and wound 2 or 3 times around it, ending with any desired hook-up means; this would also allow for adjustment by simply winding or unwinding it to desired length.

FIG. 10 illustrates my invention as adapted to seats able to take the downward push of inertia D–E. This simplifies and lightens the assembly; the tubular means as 32d are secured to the seat frame member 16d by means as bolts 45 and the seat with the Centralpost are moving back and forth in union as described by the user. The plate 12d could be much smaller in this adaptation, since it sustains only the upward thrust of force U–E during a collision.

FIG. 11 is another adaptation of my invention wherein the downward force of D–E is transferred directly to the floor panel Ge, by specially designed skidplate means as 50, secured to the bottom ends of tubular members 32e and so shaped as to ease their gliding over the floor Ge by means of rollers as 49 or by pivot means as 51. Another solution would be to weld to the end of 32e a steel plate as 53, with sharp steel point as 43e protruding from its bottom, and the assembly enclosed in a hollow, molded booth as 54, which allows the unit to slide back and forth, but under impact of collision the sharp point 43e would pierce the plastic shell of booth 54, the carpet and the floor panel, and thus arrest the Centralpost at that point; the plate 53 would keep the tube 32e from going in any deeper, and the U-bolt means as 36e would be loose enough to allow vertical movement of the tube 32e under impact conditions. The bracing means as 34e are welded securely to 32e and the larger diameter tube 33e at their junction with the shoe means as 41e.

The tubular post means as 32e may be of varied cross sections as desired for efficient design, and may be extended to the roof panel Re and attached to the channel 31e, thus forming a "roll-over" assembly; or it could be in sections with sleeve-like connecting means as 52, permitting the system to function with or without the "roll-over" feature.

FIGS. 12, 13 and 14 illustrate still another modification of my invention, as used with the "bucket" type of seat wherein the Centralpost assembly consists of only one pipe as 32f absorbing the downward stress of D–E and a plurality of pipes as 33f absorbing the upward forces U–E. The two pipes as 33f are bent at their lower ends to slidably operatively engage with larger pipes 55 which are welded in parallel relationship to each other to the sides of plate 12f, which in turn is secured to the tunnel Tf. The means as 36f attached to seat frame means as 16f are used to attach the Centralpost to the seat for adjustment purposes only; and they can be omitted if the means as 61 are used which allow for both adjusting and locking of the unit at the center console.

FIG. 14 shows in more detail wherein the tube 32f is welded to plate 58 which is slidably operative between two Z-bars as 59 secured to the bottom plate 12f by means as 60. The threaded bolt as 35f has sharp, hardened point which is screwed below the lower surface of the plate 58, while still allowing free sliding of it between the Z-bars 59; but under impact of a collision it would be pressed into the top surface of plate 12f and lock the whole assembly in solid position. Also, the tube 32f could be easily provided with slidably adjustable means to support an adjustable armrest as 68f with locking means as 29f.

FIGS. 15, 16, 17 and 18 illustrate just a few of innumerable adaptations, modifications, and combinations of structural features that may be employed in designing and constructing my Centralpost assembly without departing from the proper scope of my invention.

FIG. 15 shows an assembly consisting of four main upright tubular members suitable for "bucket seat" with one of the pipes usable as a "roll-over" bar.

FIG. 16 illustrates the use of only two upright pipes with proper bracing; this could be used with the "bench type" seat.

FIG. 17 shows a very sturdy five member assembly, with the center one acting as a "roll-over" bar; this would be ideal for sports cars since this unit would fit right into the center console or could be enclosed to form a glove box, trays, drawers, etc.

FIG. 18 shows a combination of tubular means used with steel plates or stampings, and again the combinations are limited only by the imagination of engineer, designer or stylist, and the requirements of the situation at hand.

FIGS. 19, 20, and 21 illustrate still another variation of the present invention, adapted especially for existing vehicles with center arm-rests. The assembly consists of two Z-bars as 14g secured in parallel relation to each other to the floor plate 62 which is secured to the floor tunnel Tg, and inclined in side elevational plane to conform to the angular travel of the seat 4g as explained in FIGS. 1 to 5 of this application. The upright structural assembly of this Centralpost consists of the plate as 64 welded in transverse direction to the top surface of the bottom plate 12g; and the vertical brace plate 65 is welded to the longitudinal center line of 12g and the vertical center line of 64, thus forming a very rigid structure.

Within the channel section 13g, as clarified in FIG. 12, are located in "grippers," triangular bars of hard steel as 35, secured by means as rivets 66, which allow the plate 12g to glide freely on Z-bars 14g, but in a collision they would "lock" the plate by co-acting with the Z-bars 14g for the duration of any excessive deceleration; the means as 67 attach the assembly to the seat structure below the folding center arm-rest as 68. The upper section of plate 64 has a plurality of locating holes as 71, to which is adjustably secured by means as 69 an upper anchor plate 70, which contains holding means as 72 for the top anchor means 10g. For installations where the front seat does not have anti-tilting means of its own, the spring loaded bolt means as 25g with quick release means as 27g may be attached to the seat-back cushion frame 16g. Also, as shown in FIG. 20, the plate 74 coacting with the bolt means 25g may have a plurality of holes as 73 to allow for tilting adjustment of the seat-back cushion 5g and locking it in any desired angular position.

FIG. 22 illustrates another very simple adaptation of the present invention. Two steel straps as 75 and 76 are secured to the tunnel Th in a spaced, transversely parallel relationship with each other, and if additional energy dispersion area is needed, two strips as 77 may be added; the front strip 75 has secured to it slidable means as 78 and the back strip 76 two angles modified as 79 to slidably and operatively receive plate 80 which, together with the upright plate as 64h and bracing plate as 65h make up the basic assembly of the Centralpost. If needed, the locking means as 35h may be added, and holding means as 67h secure the whole unit to the seat. The modified head plate 70h may be adjusted to any desired height.

FIG. 23 shows another embodiment of my invention as adapted for sports cars with "bucket" seats, using one unit diecasting or heavy stamping as 81, which is secured to the plate 12k operatively slidable over the Z-bars as 14k. Additional straps as 82 may be used for further dispersion of kinetic energy in a collision. The longitudinal position of the unit may be controlled by such means as 22k with remote control means as 18k; or the means as 35k may be used for locking the unit under impact. The post 81 could be provided with means as 29k to install and adjust the top anchor unit as 10k and extension as 30k to act as a "roll-over" bar in conjunction with the roof reinforcement means as 31k. The modified top anchor unit 10 may have provision for tilt adjustment means such as 25k, 27k and 73k as explained in more detail in FIG. 19. The armrest 68k is supported by means as 83 and is held in a two-way adjustment by means as 29k. The head anchor means 28k may be of many types.

FIG. 24 and 25 illustrate another simple way of providing an auxiliary reinforcing structure for secure mounting of top anchor means as 10m for a seat located in close proximity to any sturdy side structural means such as the side pillars as Bm. The rigid beam assembly as 84 is fitted transversely between the two pillars as Bm and secured to them by welding, riveting, bolting or any other means as 85. The outboard end plate means as 86 would assume various configurations to match those of the adjoining structures and they would allow the beam 84 to accomodate the seat at its rearward position; so that even when the seat was moved forward, the beam 84 would stay, and the adjustable top anchor means as 10m, which are vertically adjustable by means as 87 would be simply unwound enough to compensate for the gap between the seat and the beam structure 84. The "roll-over" means as 30m could be added to create a very rigid ring of steel in this midsection of the vehicle. Also, the structure 84 could be of any desired shape to meet the requirements of the overall style, or it could be of simple steel tubing as suggested in FIG. 27.

FIG. 25 shows one of many ways to make the transverse beam 84 adjustably co-active with the seat: the structural beam 84 is mounted directly to the back of the seat-back 5m, and on each side it is provided with modified bolting means as 21m to operatively engage with means as 88 attached by means 85 to the outboard body structures such as Bm. The remote controls such as 20m could be used to actuate the bolt means 21m.

FIG. 26 illustrates another modification of my patent as used to provide rigid support for top anchor means as 10n for the use of the rear seat occupants of vehicles. Just underneath the back package shelf panel 89 and back of the cushion 9n is positioned rigid tubular beam 84n, and it is attached to the structural means of the rear-quarter panel and pillar Cn by assemblies as 86n, attached by any suitable means as 85n. If the pillars Cn and the roof Rn would be sufficiently reinforced, and especially if the "roll-over" bar as 30n would be added, a very rigid structure would result. The top anchor means 10n could be of any sufficient style desired.

FIG. 27 illustrates one of many possible ways to adapt my new invention for use in any public conveyances subjected to possible crashes or severe decelerations. If the existing seats are not strong enough to absorb the additional load which the three-point suspension body restraining devices would subject them to, a heavy upright assembly as 90, fastened to the floor by means as 91 is adapted to receive tubular members as 92 and 93, which are secured to it on the inboard side and to the outer body structure of the vehicle on the outboard side by such means as plates 94 secured by means as 95. The upright tubular pillar as 30*p*, attached to any upper rigid component by means as 99 could be added for extra support. Also, if converting existing vehicles, the regular legs as 96 could be left as they are, and also if the bottom of the existing seat structure is strong enough to support the lap belt anchors as 7*p*, then the lower tubular unit 93 could be omitted, and they could be attached to the frame of the seat. The shape of the pillar 90 is at the discretion of the stylist or designer, and even the juncture of 92 and 93 with 90 and 94 could be of any type, including just threaded pipes fitted into threaded fittings of pillar 90 and plates 94.

In conclusion of this description, it must be understood that there is an endless variety of possible combinations, shapes, contours and materials used, means of securing them and adapting them to existing or emerging requirements as dicated by demands, styling or prices, and that the embodiments shown are given by way of example only and not in a limiting sense.

Also, most of the disclosed adaptations of my invention, like those shown in FIGS. 1, 2, 7, 13, 14, 15 and 24 could be very easily "built in" into the seat, so that only some parts would be seen, while the basic structure of the central post would become part of the integral structure of the seat, and even the plate 12 could be concealed underneath the seat without departing from the basic scope of my invention.

It is further understood that this invention is not to be limited to the exact construction shown and described, but that various departures may be made without departing from my invention. It is obvious from the foregoing brief description of my invention that there are a great many possible variations and combinations and that other operating means could readily be incorporated in the various preferred embodiments, and that this invention is susceptible to further modification, variation, combination and change without departing from the proper scope of fair meaning of the appended claims.

I claim:

1. An auxiliary multi-function seat-supporting structure for seats of an enclosed transportation vehicle, positioned back of the seats and operatively attached to them, and secured to the immediately adjacent components of the floor structure of said vehicle and to the lower sides of the vehicle body immediately adjacent said seats and configured to provide:

means of additional support and transverse rigidity for said seats;

means to stabilize said seats in any preselected position during any severe deceleration of said vehicle;

means to prevent said seat from collapsing, upending and dislocating during a collision of said vehicle;

means for easy, convenient connecting and disconnecting of any individual-restraining devices used by said seat occupants back and inboard of their shoulders.

2. An auxiliary seat supporting structure as claimed in claim 1, adapted for vehicles with adjustable seats, comprising two major assemblies: a substantially upright assembly of rigid components configured in shape of a central-post, to be positioned directly behind said seat and operatively connected to it, so that the two adjust back and forth and up and down in unison, and comprising on its bottom means of slidable, adjustable and lockable engagement with a specially configured floor-plate assembly which is permanently secured to the floor structure of said vehicle.

3. An auxiliary seat supporting structure as claimed in claim 2, wherein said upright assembly, in its side view diagram assumes the form of a thin triangle; its height governed by the height of the seat-back cushion of said seat, its forward-facing side following the back contour of said seat-back cushion; its bottom side in cooperative sliding and lockable engagement with said floor-plate which also anchors the lower inboard attachment means for said individual-restraining devices, while their upper attaching means are anchored at the upper apex of said triangular assembly; the two-element lower forward apexes comprising means which are coacting in locking of said assembly to its floor-plate in following manner: under severe deceleration of said vehicle the restrained occupant's upper torso exerts forward pull on the upper apex of said triangular assembly; this is converted into downward push on the forward apexes and through them into said floor-plate and adjacent vehicle floor structure, while the whole assembly pivots forwardly about the stronger back apex which is also locked to said floor-plate by said deceleration.

4. An auxiliary seat supporting structure as claimed in claim 2, wherein said central-post is configured from tubular means welded together to form a modified tripod-like assembly with its pinacle blunted by a transverse bar positioned behind the upper seat-back cushion of said seat; the lower portions of its two forwardly leaning and transversely diverging legs transversely positioned behind and slidably, operably secured to the rigid frame of the seat-cushion frame structure, and the third leg of said tripod extending from the transverse center of said top transverse bar substantially downwardly and rearwardly and comprising on its bottom specially configured rigid means for cooperative, slidably adjustable and lockable engagement with a longitudinally disposed rigid means secured to said floor-plate means, said engageable means so configured whereby said tripod means will, under normal conditions slide back and forth and up and down in unison with said seat structure and lock with it at any longitudinal and vertical position of its slidable adjustability at the will of its occupant.

5. An auxiliary seat supporting structure as claimed in claim 2, comprising inertia responsive and actuating means to automatically, instantly and positively lock said assembly to said floor-plate means during any sudden deceleration of said vehicle, thus preventing any longitudinal sliding movement of said seat for the duration of said deceleration.

6. An auxiliary seat supporting structure as claimed in claim 2, adapted for split seats and bucket-seats wherein said central-post is configured from tubular means welded together to form a modified tripod-like assembly with its pinacle blunted by a transverse bar positioned behind the upper seat-back cushion of said seat; the two outboard legs of said tripod secured to the outboard ends of said transverse bar and leaning downwardly to follow the inclined back contour of said seat-back cushion, with at least one of them attached to one of said bucket seats and comprising on their bottoms specially configured rigid means for cooperative, slidably adjustable and lockable engagement with similarily configured, longitudinally disposed rigid means secured to the outboard portions of said floor-plate means; the center leg welded to the transverse center of said top transverse bar on its top and extending downwardly and forwardly toward the front section of said floor-plate means and comprising on its lower end means of cooperatively slidable and lockable engagement with longitudinal rigid means secured to the transverse center of said floor-plate, said means so configured whereby normally said tripod means will slide back and forth with one of the seats but will positively lock in place with said floor-plate means during any severe deceleration of said vehicle.

7. An auxiliary seat supporting structure as claimed in claim 2, so configured whereby the force-factor that triggers, locks and holds said central-post to its floor-plate means under severe deceleration of said vehicle is directly proportional to the rate of deceleration factor of said vehicle and the total inertia load of said seat and its occupants.

8. An auxiliary seat supporting structure as claimed in claim 2, said central-post assembly so configured whereby the inertia load exerted upon it by said seat and its restrained occupants during any severe deceleration of said vehicle is transferred into the adjacent floor structure of said vehicle body.

9. An auxiliary seat supporting structure as claimed in claim 2, said central-post assembly so configured whereby the inertia load exerted upon it by said seat and its restrained occupants because of any sudden deceleration of said vehicle is transferred partially into the adjacent floor structure of said vehicle and partially into downward pressure on the rigid structure of the adjacent seat.

10. An auxiliary seat supporting structure as claimed in claim 2, comprising emergency locking means which are so configured and positioned that while they are normally disengaged during normal driving conditions of said vehicle, thus allowing free slidably adjustable positioning of said central-post over its floor-plate, they become instantly engaged whenever said vehicle is subjected to any sudden deceleration, thus locking said central-post to its floor-plate, preventing it from any unwanted movement over it whenever any severe pull is exerted against the pinacle of said central-post.

11. An auxiliary seat supporting structure as claimed in claim 10, wherein said emergency locking means comprise inertia triggered and activated piercing means configured at the bottom of the two forwardly leaning legs of said central-post coacting with the reinforced floor adjacent to said floor-plate.

12. An auxiliary seat-supporting structure as claimed in claim 11, wherein said piercing means comprise arresting plates limiting the extent of their penetration through said floor panel, and easily compressible and pierceable shielding means permitting their easy gliding over said floor surface under normal driving conditions, but allowing them piercing of specially modified floor panel means under severe pull against said pinacle of said central-post.

13. An auxiliary seat supporting structure as claimed in claim 11, wherein said piercing means are configured to be coacting against specifically designed replaceable strips of pierceable material installed into longitudinal channel means secured to said floor-plate means to provide very sensitive means of locking said central-post to said floor-plate means under any severe pull against said pinacle of said central-post assembly.

14. An auxiliary seat supporting structure as claimed in claim 4, adapted for use in vehicles with seats which are attached to the floor by means strong enough to prevent their dislocation from said floor during a collision of said vehicle, wherein the bottom ends of said forward legs of said central-post are configured to be secured directly to the rigid frame structure of said seat for cooperatively slidable engagement with it, thus allowing the kinetic energy of the occupied seat, under severe deceleration of said vehicle, to be partially transferred into said seat structure.

15. An auxiliary seat supporting structure as claimed in claim 4, wherein said means of slidable positioning, locking and holding of said central-post to its floor-plate means during any sudden deceleration of said vehicle comprise a combination of modified shoe-type means secured to the bottom of said third leg of said tripod slidably coacting and locking with a modified T-rail means secured to said floor-plate means and inclined at the same angle of inclination as said seat adjustment means are configured to slidably function on.

16. An auxiliary seat supporting structure as claimed in claim 2, adapted for seats with tiltable seat-back cushions comprising means whereby the upper portion of said central-post may secure the upper portion of the seat-back cushion in plurality of angular positions in such manner whereby its tilting, positional adjustability and locking to said central-post and its floor-plate means are controllable by and in conjunction with the existing remote-control means commonly used for such vehicular seats.

17. An auxiliary seat supporting structure as claimed in claim 16, wherein said various means of disposition, adjustment and locking of said seat and its tiltable cushion to proper components of said central-post and its floor-plate means are remotely controlled by and in conjunction with electricaly powered, remotely controlled means presently used for operating such seats.

18. An auxiliary seat supporting structure claimed in claim 2, wherein said central-post comprise means to automatically adjust itself to any position that said adjacent seat is able to assume, to automatically, positively lock itself to its floor-base means whenever said vehicle is subjected to any severe deceleration, and to stay in that locked position for the duration of said deceleration.

19. An auxiliary seat supporting structure as claimed in claim 1, wherein said connecting means for use with different individual restraining devices are positioned substantially at the transverse center of said seat supporting structure and comprise means whereby a plurality of various types of said restraining devices may be easily attached and detached to and from said seat supporting structure by said seat occupants.

20. An auxiliary seat supporting structure as claimed in claim 1, wherein said top connecting means are configured for their easy adjustability in vertical, transverse and longitudinal directions to accomodate occupant's seated torso height and to make the attachment and detachment of his personal restraining device to said seat supporting structure behind his head and inboard from his shoulder easy and convenient.

21. An auxiliary seat supporting structure as claimed in claim 2, wherein said central-post assembly comprises on its top adjustably positionable anchoring means configured for easy one-handed attachment and detachment of individual restraining devices as used by said seat occupants, and said bottom floor-plate means configured for anchoring of the inboard side of the lap-belt element of said individual restraining devises as used by said vehicle seat occupants.

22. An auxiliary seat supporting structure as claimed in claim 2, wherein said upright assembly is configured to be partially integrated into the structural and operational configuration of said seat, thus practically becoming one unit with it, with only some of its structure, some controls and the means for attaching said restraining devices being exposed.

23. An auxiliary seat supporting structure as claimed in claim 2, wherein those parts of said central-post which are subject to possible unwanted and harmful contact with the decelerating bodies of occupants of the seat directly back of said rigid post are covered with padding and other impact absorbing materials and finished to harmonize with the rest of said seat assembly.

24. An auxiliary seat supporting structure as claimed in claim 6, wherein said means of slidably adjustable and lockable engagement of said post with its floor-plate means comprise a combination of modified tubular means of one diameter secured to the bottom of said central-post and adapted to slidably adjust and lock with modified tubular means of different diameter attached to said floor-plate means.

25. An auxiliary seat supporting structure as claimed in claim 2, wherein said central-post comprise four substantially verticaly disposed tubular members connected at their upper ends to a transverse member positioned back of said seat-back cushion and disposed as follows: two outboard members attached at their upper ends to the outboard ends of said top transverse member, with their lower ends secured to the transverse edges of their base-plate means, and the other two attached to the transverse center of said transverse member on their upper ends, with one inclined forwardly for attachment to the front of said base-plate and the other one inclined rearwardly and attached on its lower end to the rear center of said base-plate.

26. An auxiliary seat supporting structure as claimed in claim 2, wherein said central-post structure is reinforced by incorporating additional rigid auxiliary members to its structural configuration, linking them at their lower ends to each other and bracing them in their midsection, and when said assembly is intended to serve as a roof support for said vehicle, by making at least the central leg of said central-post assembly correspondingly more rigid.

27. An auxiliary seat supporting structure as claimed in claim 2, comprising means wherein said central-post is configured to be extendable upwardly by easily removable means whereby it will reach to the reinforced section of the roof panel of said vehicle, thus forming a rigid central support for said roof to resist its collapse should said vehicle be accidentaly overturned.

28. An auxiliary seat supporting structure as claimed in claim 2, wherein portions of said central-post assembly are configured to support an armrest, a console, a utility enclosure and container means intended for use and convenience of occupants of said seats.

29. An auxiliary seat supporting structure as claimed in claim 2, comprising means to allow said seats to be longitudinally and vertically adjustable in predetermined graduated degrees of their adjustment and lockable therein by remote control means, wherein said floor-plate assembly is configured in two slidably cooperative elements: the floor-plate element configured to conform to the contour of said vehicle floor and disposed at the same degree of longitudinal inclination as the seat structure adjusts on, and secured permanently to said floor, and the central-post base-plate element secured to the bottom ends of said central-post structure and configured for operative, slidably adjustable and locking engagement with said floor-plate element in such manner whereby said central-post will adjust and lock in unison with said seat.

30. An auxiliary seat supporting structure as claimed in claim 29, wherein said means of adjustment and locking of said base-plate means to said floor-plate means comprise a combination of modified channel means secured to said base-plate means slidably and adjustably cooperating and locking with modified Z-bar means secured to said floor-plate means.

31. An auxiliary seat supporting structure as claimed in claim 30, wherein said Z-bar means are attached directly to the floor of said vehicle at the same degree of inclination as said seat structure adjusts on.

32. An auxiliary seat supporting structure as claimed in claim 30, wherein said channel means comprise on their interior surfaces specially configured gripping means to coact with specially configured exterior surfaces of said Z-bar for their instant contact and locking of said Z-bar to said channel means at any time said central-post starts to tilt from its normally upright position, thus preventing its movement in any direction.

33. An auxiliary seat supporting structure as claimed in claim 30, wherein said channel means comprise a housing enclosing a spring-loaded bolt-means engageable with a plurality of holes provided in said Z-bar means to accept said bolt, means connecting said spring-loaded bolt with the customary remote control means normally used for adjustment of said seat whereby said central-post is slidably adjustable and securable in unison with said seat.

34. An auxiliary seat supporting structure as claimed in claim 2, wherein said central-post is configured of rigid steel plates welded to form a capital T in its cross-sectional plan view, with the top surface of the T facing against the back contour of said seat-back cushion and its leg positioned parallel to the center-line of said vehicle, its bottom edges welded to its base-plate means and including means of attaching it to the rigid structure of said seat-cushion and at its upper portion comprising adjustable means for attachment of individual restraining means used by occupants of said seats.

35. An auxiliary seat supporting structure as claimed in claim 34, wherein said T-shaped central-post is secured at its bottom to a rectangular plate means forming a modified T configuration with it, the back portion ot the horizontally disposed plate configured for slidably adjustable positioning and locking in cooperation with a shoe-type means secured to the vehicle floor and its front portion extending substantially forwardly for slidably adjustable positioning and locking within a channel means secured to said floor, thus allowing free longitudinal movement of said post only between said channel and said shoe-type means.

36. An auxiliary seat supporting structure as claimed in claim 2, adapted for use with tiltable seat-back cushions of said vehicle seats comprising means secured to the upper portion of said post permitting angular positioning and locking of said seat-back cushion to it in any selected position of its angularity and controlled by remote control means coacting with the existing means of such seat-cushion angular adjustability.

37. An auxiliary seat supporting structure as claimed in claim 2, adapted for vehicles with individual bucket seats with their individual means of adjustment, wherein said central-post is configured in form of a tapered pillar shaped to conform to available space, molded of rigid material and its broader bottom section secured to a rigid base-plate means configured for operatively slidable and adjustable engagement and locking with a floor-plate means secured to said floor.

38. An auxiliary seat supporting structure as claimed in claim 37, wherein said engagement and locking means between said post and said floor-plate means are remotely controllable by means located at said base-plate means configured into a center console assembly and the midd section of said pillar comprising securing means for vertically and horizontally adjustable and removable center arm-rest means, with its upper section comprising means for angular adjustment and locking of said bucket seats, while the top of said post is configured to secure adjustable means of upper attachment for individual restraining devices as used by occupants of said bucket seats.

39. An auxiliary seat supporting structure as claimed in claim 2, modified for use with seats with split seat-back cushions, as in two-door sedans, wherein said central-post is configured of rigid stampings forming a tubular pillar with its forward portion thinned down sufficiently to fit between the two halves of said cushion and attached to the rigid frame of said seat, said pillar broadened at its base for securing of it to its base-plate means which are in cooperative engagement with the floor-plate secured to said floor.

40. An auxiliary seat supporting structure as claimed in claim 1, configured for vehicles with seats which are not longitudinally and vertically adjustable and have their seat-back cushions split and angularily tiltable, comprising a substantially upright assembly of rigid components configured in shape of a central-post to be positioned directly behind said seat and partially between the two halves of said seat-back cushion, its bottom secured to a specially configured floor-plate means secured to said floor, and its upper section comprising means for locking said cushions in preselected angle of tilt, while its top is configured for securing to it adjustable means of upper attachment for individual restraining devices used by the occupants of said seats.

41. An auxiliary seat supporting structure as claimed in claim 1, configured for vehicles with unadjustable bench-type seats comprising rigid components configured to produce a substantially transversely horizontal cross-beam assembly positioned directly back of the top of the seat-back cushion of said seat and secured thereto; the outboard ends of the cross-beam secured to the nearest rigid components of said vehicle structure below its window line, to provide added transverse rigidity to said vehicle body and said seat structure and to provide means of securing plurality of adjustable attaching means for individual restraining devices used by said seat occupants.

42. An auxiliary seat supporting structure as claimed in claim 41, configured for use with adjustable bench-type seats, wherein said transverse cross-beam comprise on its outboard ends positioning and locking means operably engagable with rigid coacting means secured to rigid side structure of said vehicle at the same angle of inclination as said seat structure adjusts on, thus allowing for adjustable positioning and locking of said beam to said vehicle structure in unison with said seat, and comprising operative means for the assembly to be controlled remotely by and in conjunction with the remote control means normally used for adjusting the position of said seat by its occupant.

43. An auxiliary seat supporting structure as claimed in claim 41, wherein said transverse beam assembly is configured to be an integral part of the basic structure of said seat-back cushion, providing its main means of support, location, positioning and attachment to said vehicle structure, as well as means of adjustable securement for said upper means of attachment for individual restraining devices used by said seat occupants.

44. An auxiliary seat supporting structure as claimed in claim 41, comprising two rigid, substantially vertical reinforcing and bracing means: one attached to said rigid transverse beam on its upper end and to a structural member of the floor on its lower end; the other easily attachable on its lower end to said transverse beam and to the reinforced roof structure on its upper end, thus creating a rigid vertical brace between the floor and the roof of said vehicle.

45. An auxiliary seat supporting structure as claimed in claim 41, configured for use in multi-seat transport vehicles wherein one end of said cross-beam is secured to the rigid side structure of said vehicle, while the other end is secured to an upright post structure attached to the rigid floor means of said vehicle and configured to form the inboard end of said seat structure.

46. An auxiliary seat supporting structure as claimed in claim 1, said assembly so configured whereby the inertia load exerted upon it by said seat and its restrained occupants during any severe deceleration and collision of said vehicle is transferred into the vehicle floor and the rigid sections of the vehicle side located below its window line and immediately contiguous to said seat structure.

\* \* \* \* \*

UNITED STATES PATENT OFFICE
CERTIFICATE OF CORRECTION

Patent No. 3,885,810           Dated  May 27, 1975

Inventor(s) John J. Chika

It is certified that error appears in the above-identified patent and that said Letters Patent are hereby corrected as shown below:

Col. 5, line 17, after "and" insert --to--;
Col. 6, line 8, strike out (described), insert --desired--;

Col. 7, line 35, strike out (12), insert -- 21--;
Col. 7, line 35, strike out (in), insert --the--;
Col. 8, line 14, strike out (10), insert --10k--;
Col. 8, line 61, after "means" insert --as--;
Col. 12, line 44, after "structure" insert --as--;
Col. 12, line 61, strike out ( 1 ), insert --19--;
Col. 13, line 52, strike out (section), insert --sections--;

Signed and Sealed this fourth Day of November 1975

[SEAL]

Attest:

RUTH C. MASON
*Attesting Officer*

C. MARSHALL DANN
*Commissioner of Patents and Trademarks*